US006597151B1

(12) United States Patent
Price et al.

(10) Patent No.: US 6,597,151 B1
(45) Date of Patent: Jul. 22, 2003

(54) PORTABLE AUXILIARY BATTERY PACK FOR EXTENDED USE AND RECHARGING OF PERSONAL DIGITAL ASSISTANTS

(75) Inventors: Mark D. Price, Midvale, UT (US); Curtis Thompson, Taylorsville, UT (US)

(73) Assignee: 3Com Corporation, Santa Clara, CA (US)

( * ) Notice: Subject to any disclaimer, the term of this patent is extended or adjusted under 35 U.S.C. 154(b) by 98 days.

(21) Appl. No.: 09/679,056

(22) Filed: Oct. 2, 2000

(51) Int. Cl.$^7$ ................................................ H02J 7/00
(52) U.S. Cl. ...................................... 320/105; 320/114
(58) Field of Search ........................... 429/96, 97, 100; 320/103, 105, 107, 114; 708/100

(56) References Cited

U.S. PATENT DOCUMENTS

| | | | | |
|---|---|---|---|---|
| 5,321,580 A | * | 6/1994 | Hosoi et al. | 361/684 |
| 5,455,737 A | * | 10/1995 | Ogami et al. | 429/100 |
| 5,635,814 A | * | 6/1997 | Afzal et al. | 429/100 |
| 5,641,588 A | * | 6/1997 | Sieminski et al. | 429/98 |
| 5,677,827 A | * | 10/1997 | Yoshioka et al. | 361/683 |
| 5,733,674 A | * | 3/1998 | Law et al. | 429/9 |
| 6,110,618 A | * | 8/2000 | Vacheron et al. | 429/100 |
| 6,130,519 A | * | 10/2000 | Whiting et al. | 320/105 |
| 6,191,941 B1 | * | 2/2001 | Ito et al. | 429/99 |
| 6,219,681 B1 | * | 4/2001 | Hawkins et al. | 708/100 |
| 6,261,715 B1 | * | 7/2001 | Nakamura et al. | 429/100 |
| 6,274,266 B1 | * | 8/2001 | Wang | 429/163 |
| 6,294,286 B1 | * | 9/2001 | Gosior et al. | 429/96 |

OTHER PUBLICATIONS

US 6,335,860, 1/2002, Shin et al. (withdrawn)*

* cited by examiner

Primary Examiner—Edward H. Tso
Assistant Examiner—Pia Tibbits
(74) Attorney, Agent, or Firm—Wagner Murabito & Hao LLP

(57) ABSTRACT

A portable auxiliary power source system and method of the present invention facilitates extended portable use of a handheld computer without being unconnected to a fixed power source. A present invention portable auxiliary power source system is mobile and accommodates energy resources that are easily replenished. In one embodiment a portable auxiliary power source system includes a battery compartment, coupling component and electrical interface. The battery compartment holds a energy source such as battery. The coupling component is configured to couple with a handheld computer. The electrical interface is fabricated to provide a communications port for communicating electrical signals from the portable auxiliary power source system to a handheld computer. In one exemplary implementation of the present invention the battery compartment includes terminal tabs comprising electrically conductive material (e.g., copper) adapted to contact a battery terminal and provide an electrical path for electrical charges along wiring to the electrical interface. The electrical interface comprises ports of electrically conductive material configured to provide a path for conveying electrical charges to a hand held computer. In one exemplary implementation the battery compartment is an easily accessible compartment adapted to hold an off the self removable battery.

19 Claims, 6 Drawing Sheets

500

Fabricating a battery compartment for holding batteries.
510

Fabricating coupling of a portable power source to a hand held computer.
520

Supplying a hand held computer interface.
530

Furnishing an electrical path for transferring electrical power from the battery compartment to a hand held computer.
540

FIG. 5

PORTABLE AUXILIARY BATTERY PACK FOR EXTENDED USE AND RECHARGING OF PERSONAL DIGITAL ASSISTANTS

BACKGROUND OF THE INVENTION

1. Field of the Invention

This invention relates to the field of computer performance maximization. More particularly, the present invention relates to a system and method of providing portable auxiliary power to a handheld computer.

2. Related Art

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Electronic systems designed to produce these results typically consume energy and power supplies for devices such as a portable handheld computer are often limited.

As the components required to build an electronic system have reduced in size, new categories of systems have emerged. For example, one new category of computer systems is the hand held or "palmtop" computer system. A palmtop computer system is a computer that is small enough to be held in the hand of a user and can be "palm-sized." One of the primary advantages of a palmtop computer is mobility. The convenient portable size permits a user to utilize a hand held computer for a variety of activities at a number of remote locations and traveling between locations. However, access to power supplies (e.g., standard outlets that deliver utility power) for utilizing or recharging the handheld computer are often not available at a remote location or when traveling between locations.

Electronic systems such as hand held computers typically consume power at varying rates when performing different tasks and accurately forecasting energy consumption is usually difficult. Hand held computers typically perform a wide range of information manipulation and computation functions. One very popular type hand held computer is personal digital assistants (PDAs) that are typically used to implement various personal information management (PIM) applications such as an address book, a daily organizer and electronic notepads, to name a few. Numerous processor based electronic systems such as hand held computers operate at differing power requirements or ranges. For example, a handheld computer (such as a Palm V Connector Organizer) performing Personal Information Management (PIM) tasks may require a processor to operate at a level of one Million Instructions Per Second (MIPS) while running User Interface tasks and a radio communication protocol stack simultaneously may require a processor to operate at five to ten MIPS. Another example of differing processing levels is a V.90 modem that requires approximately twice as may comparable processing cycles per unit of time (e.g., per second) as a modem which implements a slower V.34 protocol. The nature and variety of operations performed by a typical hand held computer make it difficult to accurately predict when a limited power supply will be depleted.

The compactness of a hand held computer usually limits the size of its own self contained power supply. The power source often comprises a relatively small internal battery with a limited life and restricted ability to provide energy. Limited energy resources are typically consumed very fast when a handheld computer is performing at maximum levels. Energy consumption in a handheld computer is often critical to the utility of a portable device, as limited power resources are consumed the shorter duration a portable device is able to remain mobile and operate longer away from a fixed power source. A user has to make more frequent trips to a recharging source (e.g., standard wall outlet) decreasing the convenience of portable operation. Relatively frequent and continuous trips to a fixed power source are required when a handheld computer is utilized to perform for extended periods of time, removing many of the benefits of a portable unit.

What is required is a system and method that facilitates extended portable use of a handheld computer. The system and method should assist a portable hand held computer to remain mobile longer and operate away from a fixed power source for greater periods of time.

SUMMARY OF THE INVENTION

The present invention is a system and method that facilitates extended portable use of a handheld computer. A portable auxiliary power source system and method of the present invention assists a portable hand held computer to remain mobile longer and operate unconnected from a fixed power source for greater periods of time. The portable auxiliary power source system and method facilitates recharging of hand held computer nonremovable batteries. In one exemplary implementation of the presented invention the portable auxiliary power source system utilizes an off the self removable battery as an energy supply.

A present invention portable auxiliary power source system is mobile and accommodates energy resources that are easily replenished. In one embodiment a portable auxiliary power source system comprises a battery compartment, coupling component and electrical interface. The battery compartment holds a energy source such as battery. The coupling component is adapted to couple with a handheld computer. The electrical interface is adapted to provide a communications port for communicating electrical signals from the portable auxiliary power source system to a handheld computer. In one exemplary implementation of the present invention the battery compartment includes terminal tabs comprising electrically conductive material (e.g., copper) adapted to contact a battery terminal and provide an electrical path for electrical charges along wiring to the electrical interface. The electrical interface comprises ports of electrically conductive material configured to provide a path for conveying electrical charges to a hand held computer. In one exemplary implementation the battery compartment is an easily accessible compartment adapted to hold an off the self removable battery.

BRIEF DESCRIPTION OF THE DRAWINGS

FIG. 5 is a flow chart of portable auxiliary power source method, one embodiment of the present invention.

DETAILED DESCRIPTION OF THE INVENTION

Reference will now be made in detail to the preferred embodiments of the invention, a portable auxiliary power source system and method for extended use and recharging of personal digital assistants, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a portable auxiliary power source system and method for facilitating extended use and recharging of personal digital assistants. The relatively small size of a present auxiliary power source system allows it to remain portable and easy to use. The convenient features of the portable auxiliary power source system and method permits a user to recharge a handheld computer battery without being coupled to a fixed utility power source. The portable auxiliary power source system and method provides auxiliary power for palmtop computer processing operations at remote locations where fixed energy resources are either not available or are inconvenient. It is also facilitates convenient auxiliary power supply for information manipulation and computing processes when traveling between sites. A dynamic performance adjustment system and method of the present invention is capable of adjusting performance (e.g., voltage and clock speed) in a manner that provides power conservation when a task does not require a functional circuit at its maximum capability. In one embodiment of the present invention, a dynamic performance adjustment system and method determines when the maximum capacity of a functional circuit is not required to perform a task and adjusts a power supply voltage accordingly.

Figure 1A:
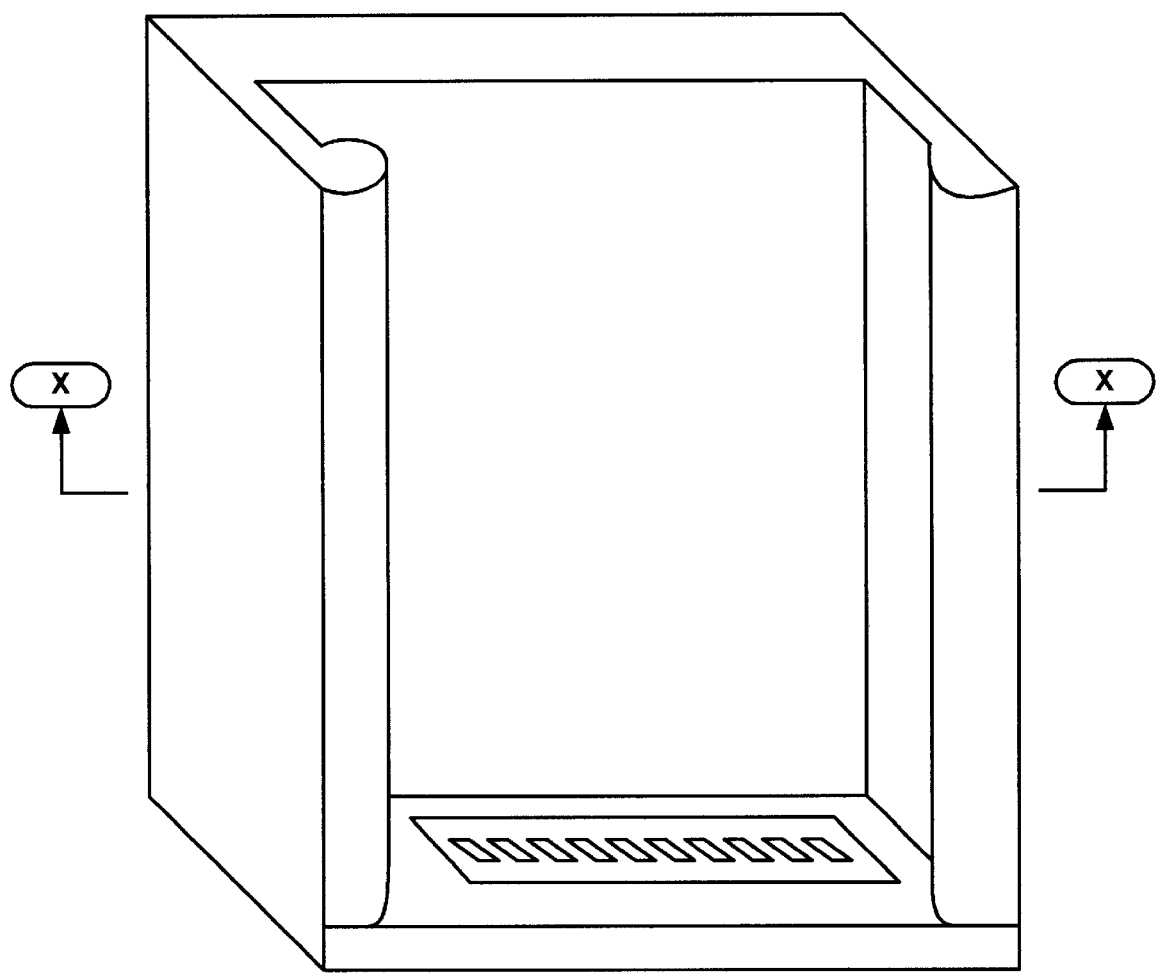
FIG. 1A is an isometric block diagram of a portable auxiliary power source system in accordance with one embodiment of the present invention.
Figure 1B:
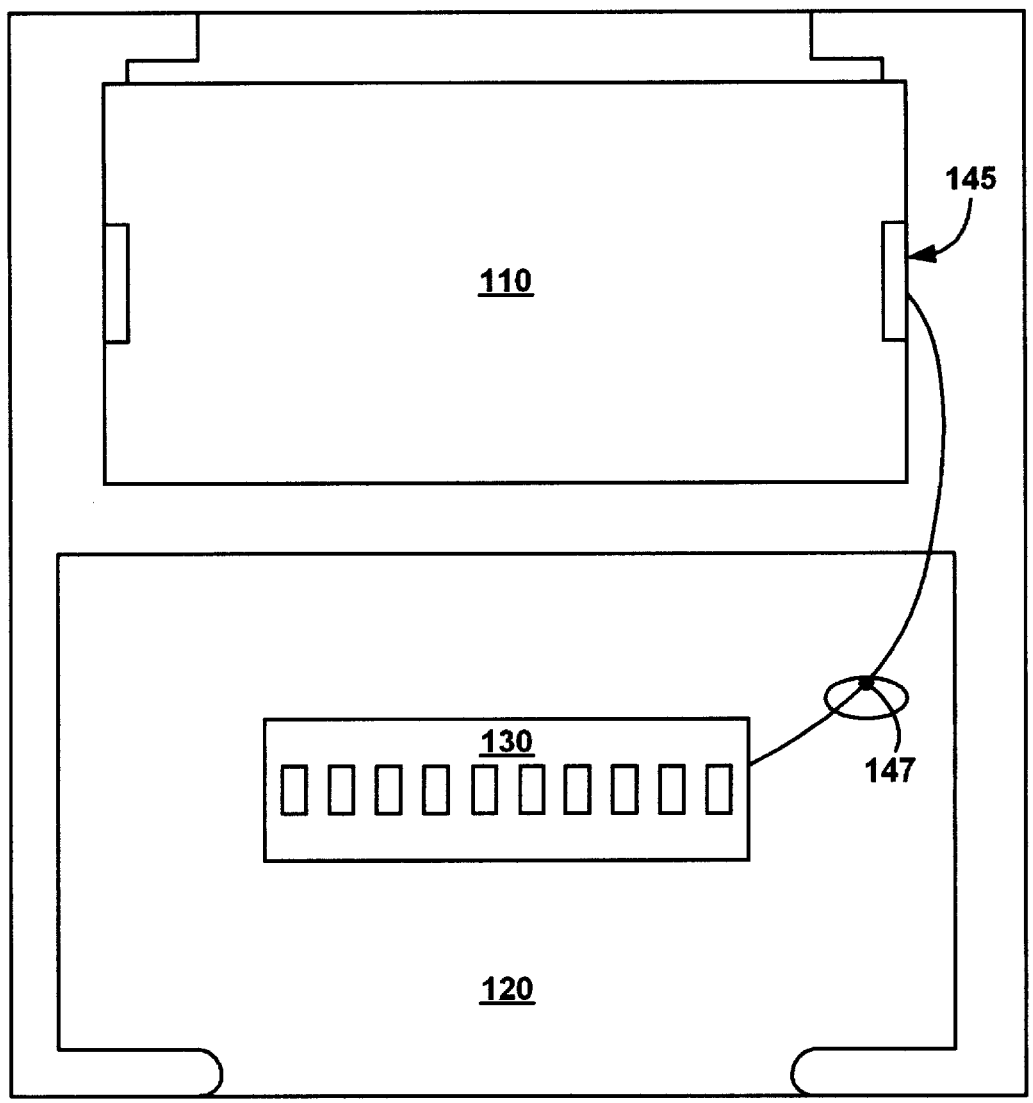
FIG. 1B is a cross sectional view block diagram of a portable auxiliary power source system in accordance with one embodiment of the present invention.

FIG. 1A is an isometric block diagram of a portable auxiliary power source system in accordance with one embodiment of the present invention. FIG. 1B is a top cross sectional view block diagram of portable auxiliary power source system 100 through cut line X. Portable auxiliary power source system 100 comprises a battery compartment 110, coupling component 120 and electrical interface 130. Battery compartment 110 and coupling component 120 are coupled to electrical interface 130. Battery compartment 110 is an easily accessible compartment adapted to hold a battery. Coupling component 120 is adapted to couple with a handheld computer. Electrical interface 130 is configured to provide a path for conducting electrical charges from portable auxiliary power source system 100 to a hand held computer. In one embodiment of the present invention, electrical interface 130 includes output ports comprising conductive material (e.g., copper) configured to couple with a hand held computer peripheral device interface.

In one exemplary implementation of the present invention, the battery compartment is adapted to extract electrical charge from a battery. In one embodiment of the present invention a battery compartment includes terminal tabs (e.g., terminal tab 145) comprising electrically conductive material (e.g., copper) adapted to contact a battery terminal and provide an electrical path for electrical charges. In one embodiment of the present invention, a portable auxiliary power source system includes wiring (e.g., wiring 147) providing a path for conducting electrical charges from the terminal tabs to electrical interface 130.

Figure 2:
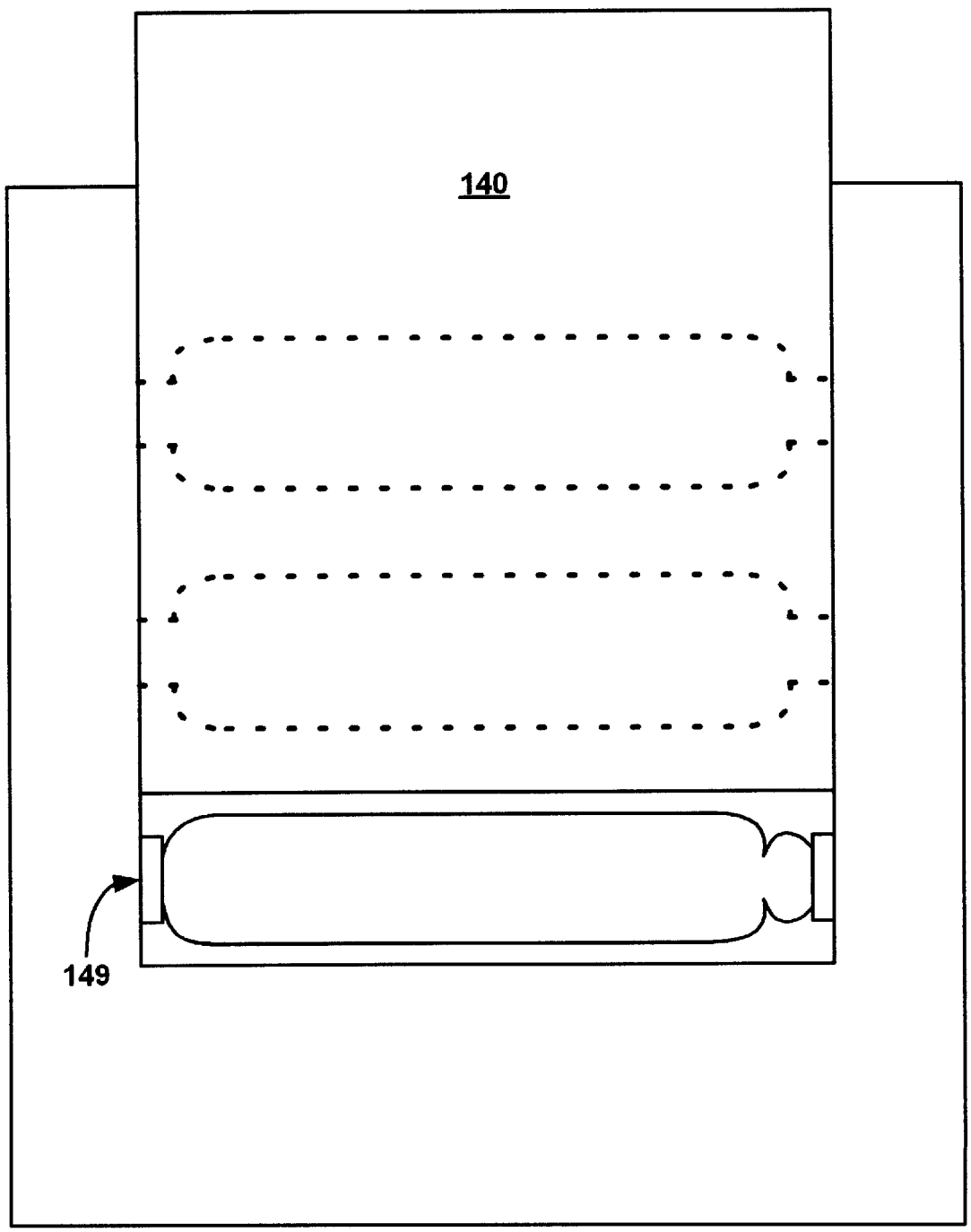
FIG. 2 is a block diagram of a backside view of one embodiment of a portable auxiliary power source system comprising access door.

FIG. 2 is a block diagram of a backside view of one embodiment of portable if auxiliary power source system 100 in which battery compartment 110 is an easily accessible compartment comprising access door 140. Access door 140 provides easy access to battery compartment 110 which is configured to hold a removable standard (e.g., off a store self) battery. In one embodiment of the present invention the terminal tabs (e.g., terminal tab 145) exert a force on the terminal of the battery and hold the battery in place. In one exemplary implementation of the present invention, one of the terminal tabs includes a spring (e.g., spring 149) that exerts the force on the battery holding it in position against another terminal tab. In another exemplary implementation, battery compartment 110 includes a clip for holding the battery in place.

It is appreciated that portable auxiliary power source system 100 is readily adaptable to a variety of configurations and embodiments that provide additional functionality and features. For example, in one embodiment portable auxiliary power source system 100 includes a recharging cord for plugging into a recharging port of a hand held computer instead of the peripheral device interface. In one exemplary implementation, portable auxiliary power source system 100 includes a clip for clipping to a belt for easy transportation. In one embodiment portable auxiliary power source system 100 includes accommodations for holding a rechargeable battery in battery compartment 110. In one exemplary implementation portable auxiliary power source system 100 has an alternating current to direct current converter for providing recharging energy to a rechargeable battery in battery compartment 110. In one embodiment of the present invention, portable auxiliary power source system 100 includes a power cord configured to plug into a standard wall outlet and in another it includes a power cord configured to plug into the cigarette lighter of a car.

Figure 3:
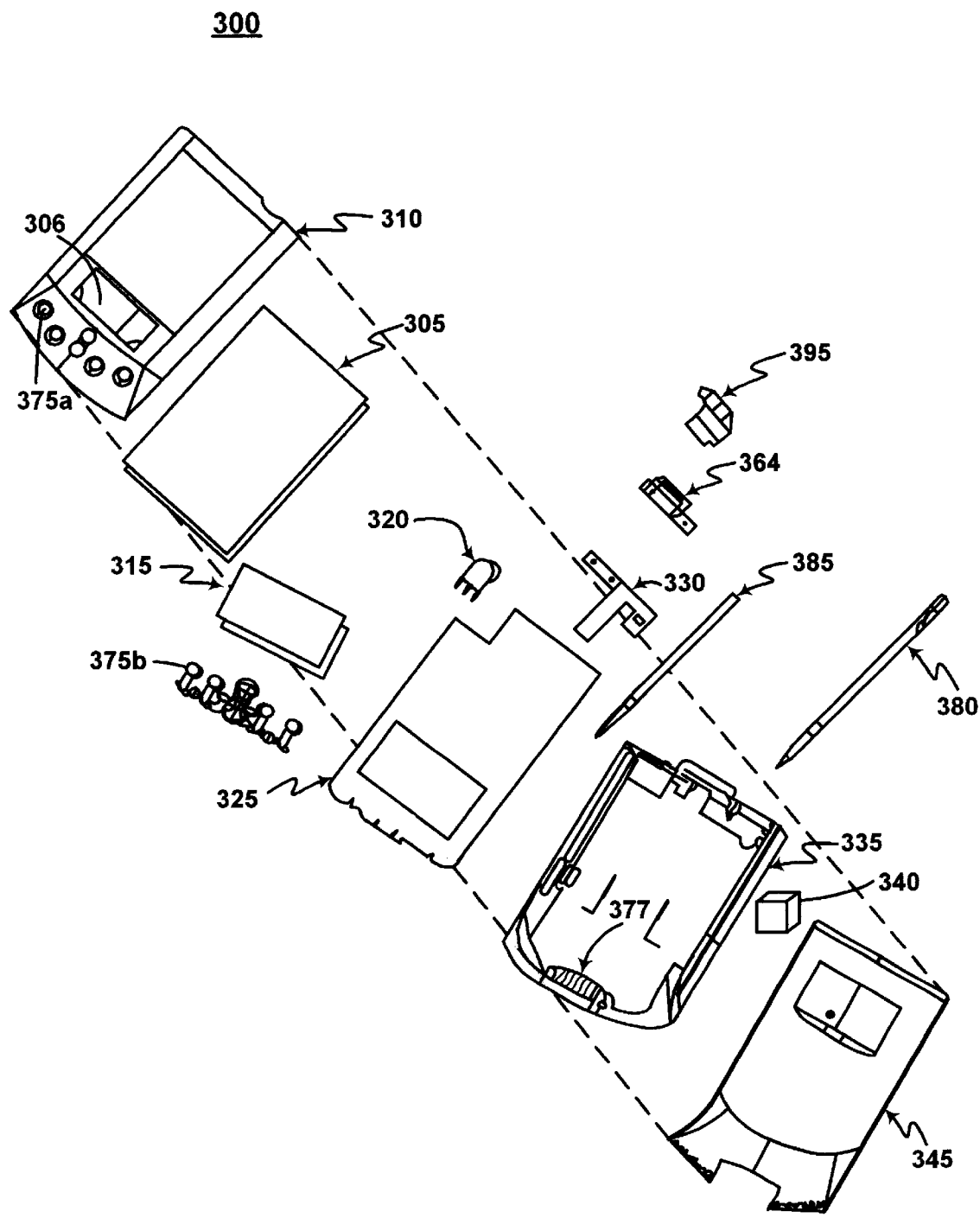
FIG. 3 is an exploded view of the hand held computer system recharged in accordance with one implementation of the present invention.

FIG. 3 is an exploded view of the hand held computer system 300 in accordance with one implementation of the present invention. Hand held computer system 300 includes front cover 310 having an outline of region 306 and holes 375a for receiving buttons 375b. A flat panel display 305 (both liquid crystal display and touch screen) fits into front cover 310. A rechargeable fixed battery 315 provides electrical power. A contrast adjustment (potentiometer) 320 is also shown. On/off button 395 is shown along with an infrared emitter of and detector device 364. A flex circuit 330 is shown along with a PC board 325 containing electronics and logic (e.g., memory, communication bus, processor, etc.) for implementing computer system functionality. The digitizer pad is also included in PC board 325. A midframe 335 is shown along with stylus 380.

Hand held computer system 300 is capable of communicating with other devices (e.g., bluetooth). Position adjustable antenna 385 for transmitting and receiving communication signals is shown. A radio receiver/transmitter device 340 is also shown between the midframe and the rear cover 345 of FIG. 3. The receiver/transmitter device 340 is coupled to the antenna 385 and also coupled to communicate with the PC board 325. In one implementation of the present invention, the Mobitex wireless communication system is used to provide two way communication between system 300 and other networked computers and/or the Internet via a proxy server. Peripheral device interface 377 is coupled to PC board 325 and provides a communications port (e.g., a serial port) for communicating signals to and from a peripheral device.

Figure 4:
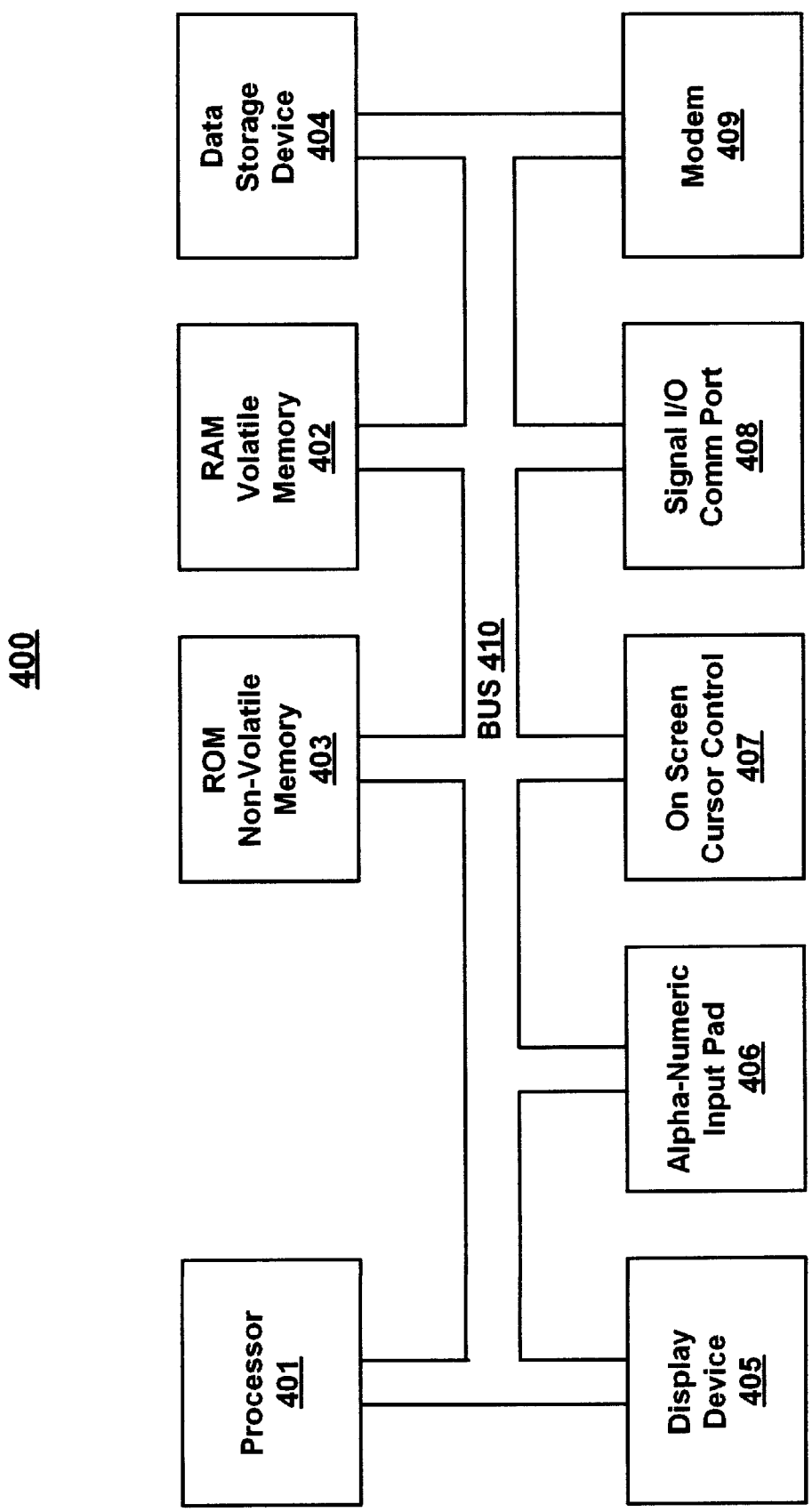
FIG. 4 is a block diagram of a computer system which is implemented in a handheld computer serviced by a portable auxiliary power source system of the present invention.

FIG. 4 is a block diagram of computer system 400, some of which is implemented on PC board 325. Computer system 400 includes address/data bus 410, central processor 401, volatile memory 402 (e.g., random access memory RAM), non-volatile memory 403 (e.g., read only memory ROM), optional removable data storage device 404 (e.g., memory stick), display device 405, optional alphanumeric input device 406, optional cursor control or directing device 407, signal communication port 408, and modem 409. Address/data bus 410 is coupled to central processor 401, volatile memory 402 (e.g., random access memory RAM), non-volatile memory 403 (e.g., read only memory ROM), optional removable data storage device 404 (e.g., memory stick), display device 405, optional alphanumeric input device 406, optional cursor control or directing device 407, signal communication port 408, and modem 409.

The components of computer system 400 cooperatively function to provide a variety of functions, including PIM, communications, etc. Address/data bus 410 communicates information, central processor 401 processes information and instructions, volatile memory 402 (e.g., random access memory RAM) stores information and instructions for the central processor 401 and non-volatile memory 403 (e.g., read only memory ROM) stores static information and instructions. Optional removable data storage device 404 (e.g., memory stick) also stores information and instructions. Display device 405 displays information to the computer user and an optional alphanumeric input device 406 is an input device, which in one implementation is a handwriting recognition pad("digitizer") having regions 306a and 306b (see FIG. 3A). Optional directing device 407 also communicates user input information and command selections to the central processor 401 via a touch screen capable of registering a position on the screen 405 where the stylus makes contact. Signal Communication port 408 is a communication interface (e.g., serial communications port 308) for communicating signals to and from a coupled peripheral device (not shown). Modem 409 facilitates communications with other devices. Main dynamic control adjustment circuit 110 controls adjustments to the performance of other components (e.g., processor 410, modem 409, etc.) and comprises a variety of configurations in different implementations. In one embodiment of the present invention, main dynamic control adjustment circuit 110 controls adjustments to the support functions (e.g., power supplies) to other components.

FIG. 5 is a flow chart of portable auxiliary power source method 500, one embodiment of the present invention for facilitating extended use and recharging of personal digital assistants. Portable auxiliary power source method 500 permits a user to use or recharge a handheld computer battery without being coupled to a fixed utility power source by providing auxiliary power for processing operations at remote locations.

In step 510 a battery compartment for holding batteries is fabricated. In one exemplary implementation of the present invention, the battery compartment is configured to electrically couple with a battery. For example, an electrical tab comprising electrically conductive material (e.g., copper) contacts a battery terminal and provides an electrical path for electrical charges. In one embodiment of the present invention, the battery compartment is constructed with an easily accessible door for to permit the insertion and removal of batteries. In one implementation of the present invention the removable batteries are secured in place by exerting a force against the battery terminals or body (e.g., a using a spring or clip to exert the force). In one embodiment of the present invention, a recharger for recharging the batteries held in the battery compartment is supplied.

In step 520 coupling a portable power source to a hand held computer is facilitated. In one embodiment of the present invention a handheld computer holder for receiving a hand held computer is furnished. The handheld computer holder is manufactured in a configuration that enables connection with a hand held computer (e.g., a configuration that allows a hand held computer to be gripped in contact with a portable power source).

In step 530 a hand held computer interface is supplied. The handheld computer interface provides a path for conducting electrical charges from portable auxiliary power source system 100 to a hand held computer. In one exemplary implementation, the hand held computer interface is manufactured to electrically couple with a hand held computer (e.g., arranged in a manner that enables electrical coupling with a peripheral device interface of a handheld computer).

In step 540 an electrical path for transferring electrical power from the battery compartment to a hand held computer is furnished. In one embodiment of the present invention, wiring is provided to form a path for conducting electrical charges from battery terminal tabs to an electrical interface.

Thus, the present invention system and method facilitates extended portable use of a handheld computer. A portable auxiliary power source system and method of the present invention assists a hand held computer to remain mobile longer and operate unconnected from a fixed power source for greater periods of time. The present invention permits extended energy for information manipulation and computation operations at remote locations and when traveling between locations. The portable auxiliary power source system and method also enables a reduction in the number of required inconvenient trips to a fixed power source for energy recharging.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A portable auxiliary power source system comprising a battery compartment for holding a battery;

an access door for providing access to said battery compartment;

a coupling component coupled to said battery compartment, said coupling component for coupling with a handheld computer; and an electrical interface coupled to said battery component, said electrical interface for providing a path for conducting electrical charges from said portable auxiliary power source system to said handheld computer.

2. A portable auxiliary power source system of claim 1 wherein said battery compartment holds a removable battery.

3. A portable auxiliary power source system of claim 1 wherein said battery compartment holds batteries to provide auxiliary power for hand held computer usage.

4. A portable auxiliary power source system of claim 1 further comprising a cord for plugging into a hand held computer.

5. A portable auxiliary power source system of claim 1 further comprising a cord for plugging into a standard wall outlet.

6. A portable auxiliary power source system of claim 1 further comprising a cord for plugging into a cigarette lighter of a car.

7. A portable auxiliary power source system of claim 1 further comprising a clip for clipping to a belt for transportation.

8. A portable auxiliary power source system of claim 1 wherein said battery compartment extracts electrical charge from the batteries.

9. A portable auxiliary power source system of claim 1 wherein said battery compartment includes terminal tabs comprising electrically conductive material for contacting a battery terminal and providing an electrical path for electrical charges.

10. A portable auxiliary power source system of claim 1 further comprising wiring providing a path for conducting electrical charges from said terminal tabs to said electrical interface.

11. A portable auxiliary power source system of claim 9 wherein said electrical interface comprises output ports comprising conductive material configured to couple with a hand held computer peripheral device interface.

12. A portable auxiliary power source system of claim 1 further comprising terminal tabs for exerting a force on the terminal of a battery and hold the battery in place.

13. A portable auxiliary power source system of claim 1 further comprising a spring that exerts a force on the battery holding it in position against another terminal tab.

14. A portable auxiliary power source method comprising:

providing a battery compartment for holding batteries;

providing access to said battery compartment via an access door;

facilitating the coupling of a portable power source to a hand held computer;

supplying a hand held computer interface; and furnishing an electrical path for transferring electrical power from the battery compartment to a hand held computer.

15. A portable auxiliary power source method of claim 14 further comprising:

configuring said battery compartment to electrically couple with a battery; and constructing said battery compartment with an accessible door for permitting the insertion and removal of batteries.

16. A portable auxiliary power source method of claim 14 further comprising supplying a recharger for recharging the batteries held in said battery compartment.

17. A portable auxiliary power source method of claim 14 further comprising:

furnishing a handheld computer holder for receiving a hand held computer; and manufacturing said handheld computer holder in a configuration that enables connection with a hand held computer.

18. A portable auxiliary power source method of claim 14 further comprising manufacturing the hand held computer interface to electrically couple with a hand held computer.

19. A portable auxiliary power source method of claim 14 further comprising providing wiring to form a path for conducting electrical charges from battery terminal tabs to the electrical interface.

* * * * *